United States Patent
Mizumura et al.

(10) Patent No.: US 9,249,294 B2
(45) Date of Patent: Feb. 2, 2016

(54) CONDUCTIVE RESIN COMPOSITION AND CURED PRODUCT THEREOF

(75) Inventors: Noritsuka Mizumura, Niigata (JP); Takashi Yamaguchi, Niigata (JP); Yoko Nagara, Niigata (JP)

(73) Assignee: NAMICS CORPORATION, Niigata (JP)

( * ) Notice: Subject to any disclaimer, the term of this patent is extended or adjusted under 35 U.S.C. 154(b) by 83 days.

(21) Appl. No.: 14/342,864

(22) PCT Filed: Sep. 4, 2012

(86) PCT No.: PCT/JP2012/072441
§ 371 (c)(1),
(2), (4) Date: Mar. 5, 2014

(87) PCT Pub. No.: WO2013/035685
PCT Pub. Date: Mar. 14, 2013

(65) Prior Publication Data
US 2014/0243453 A1  Aug. 28, 2014

(30) Foreign Application Priority Data
Sep. 5, 2011 (JP) .................................. 2011-193136

(51) Int. Cl.
*C08G 59/38* (2006.01)
*C08G 59/62* (2006.01)
*C08L 63/00* (2006.01)
*C08L 63/04* (2006.01)
*C08L 63/10* (2006.01)
*C08K 3/08* (2006.01)
*C08K 3/10* (2006.01)

(52) U.S. Cl.
CPC ........... *C08L 63/00* (2013.01); *C08K 2201/001* (2013.01); *C08L 2205/05* (2013.01)

(58) Field of Classification Search
USPC .................. 523/427, 457, 458, 461
See application file for complete search history.

(56) References Cited

U.S. PATENT DOCUMENTS

| 4,853,279 A * | 8/1989 | Shibata et al. ............... 525/115 |
| 6,887,946 B2 | 5/2005 | Fukada et al. |
| 2007/0212551 A1 | 9/2007 | Collins |

FOREIGN PATENT DOCUMENTS

| JP | 10-64331 A | 3/1998 | |
| JP | 2001-181482 A | 7/2001 | |
| JP | 2003-119248 A | 4/2003 | |
| JP | 2006124531 A * | 5/2006 | ............. C09J 201/00 |
| JP | 2007-238942 A | 9/2007 | |
| JP | 2007-270130 A | 10/2007 | |
| JP | 2010-278324 A | 12/2010 | |

OTHER PUBLICATIONS

Machine translation of JP 2006124531 A (no date).*
Machine translation of JP 2010278324 A (no date).*
English-language International Preliminary Report on Patentability and Written Opinion of the International Searching Authority dated Mar. 20, 2014 for International Appliation PCT/JP2012/072441 filed Sep. 4, 2012; Applicants: NAMICS Corporation et al.
International Search Report dated Dec. 11, 2012 for PCT/JP2012/072441.
Taiwanese Office Action dated Sep. 23, 2015, issued in counterpart Taiwanese Application No. 101132285.

* cited by examiner

*Primary Examiner* — Michael J Feely
(74) *Attorney, Agent, or Firm* — Holtz, Holtz & Volek PC

(57) ABSTRACT

A conductive resin composition which includes an epoxy resin (A), a compound (B) having a (meth)acryloyl group and a glycidyl group, a phenolic resin curing agent (C), a radical polymerization initiator (D) and a conductive particle (E). The conductive resin composition which may be B-staged (semi-cured) at a relatively low temperature to exhibit sufficient tack-free properties and excellent pressure-sensitive tackiness. This permits temporary bonding of parts without involving solvent evaporation or light illumination, thereby reducing or avoiding an increase in facility costs. The conductive resin composition may thereafter be cured (C-staged) to provide a cured product having a desirable bond strength, while maintaining a low specific resistivity.

11 Claims, 1 Drawing Sheet

CONDUCTIVE RESIN COMPOSITION AND CURED PRODUCT THEREOF

CROSS-REFERENCE TO RELATED APPLICATION

This application is a United States national phase application of International Application PCT/JP2012/072441 filed Sep. 4, 2012.

TECHNICAL FIELD

The present invention relates to conductive resin compositions and cured products thereof. In particular, the invention relates to thermally B-stageable (curable to an apparently cured but actually semi-cured state) and thermally curable conductive resin compositions and to cured products thereof.

BACKGROUND ART

In recent years, the progress in electrical technology has led to demands for miniaturization, weight reduction and higher functionality in the field of sensors such as collision avoidance sensors and acceleration sensors and in the field of electrical equipment such as semiconductor integrated circuits. To realize accurate manufacturing of complicated and fine sensors and semiconductor devices associated with the recent demands for miniaturization, weight reduction and higher functionality, there have been increasing demands for conductive resin compositions that are supplied and applied by a printing method, then semi-cured (so-called B-staged) to improve handling properties, and thereafter cured (so-called C-staged) to exhibit excellent bond strength in the bonding of electronic parts.

Such B-stageable conductive resin compositions have been proposed in the art. Some types of conductive resin compositions contain solvents and are B-staged by the evaporation of the solvents (Patent Literatures 1 and 2). Other types of conductive resin compositions are B-staged by light illumination or the like (Patent Literature 3).

CITATION LIST

Patent Literature

Patent Literature 1: Japanese Patent Application Kokai Publication No. H10-64331
Patent Literature 2: Japanese Patent Application Kokai Publication No. 2007-238942
Patent Literature 3: Japanese Patent Application Kokai Publication No. 2007-270130

DISCLOSURE OF THE INVENTION

Technical Problem

However, it is impossible to realize good tack-free properties as well as to realize sufficient pressure-sensitive tackiness permitting temporary bonding of parts with conductive resin compositions such as those disclosed in Patent Literatures 1 to 3 which are B-staged (semi-cured) by the evaporation of solvents at a relatively low temperature or by the drying of the conductive resin compositions. As used herein, the term tack-free properties means that the conductive resin compositions have lost fluidity but do not exhibit stickiness to the touch or do not become attached to the fingers. In the case of evaporating the solvents at a relatively low temperature, it becomes necessary to provide an apparatus for recovering the solvents removed by methods such as vaporization in order to reduce the environmental load, thus increasing facility costs.

Illuminators are entailed for conductive resin compositions such as those disclosed in Patent Literature 3 which contain photoinitiators and are B-staged (semi-cured) by light illumination. Thus, facility costs are similarly increased.

An object of the invention is to provide conductive resin compositions which may be B-staged (semi-cured) at a relatively low temperature to exhibit sufficient tack-free properties and pressure-sensitive tackiness without involving solvent evaporation or light illumination, thereby suppressing an increase in facility costs, and which may be thereafter cured (C-staged) to give cured products having sufficient bond strength while maintaining low specific resistivity. Another object of the invention is to provide cured products of the compositions.

Solution to Problem

The present inventors carried out extensive studies to achieve the above objects. As a result, the present inventors have found that a conductive resin composition which contains an epoxy resin (A), a compound (B) having a (meth)acryloyl group and a glycidyl group, a phenolic resin curing agent (C), a radical polymerization initiator (D) and a conductive particle (E) may be B-staged (semi-cured) at a relatively low temperature without involving solvent evaporation or light illumination, and may be thereafter cured (C-staged) to exhibit sufficient bond strength.

The invention relates to a conductive resin composition including an epoxy resin (A), a compound (B) having a (meth)acryloyl group and a glycidyl group, a phenolic resin curing agent (C), a radical polymerization initiator (D) and a conductive particle (E). In the conductive resin composition of the invention, the number of moles of the (meth)acryloyl groups in the component (B) is preferably 7 to 28 with respect to the number of moles of the glycidyl groups in the conductive resin composition taken as 100. Here, the number of moles of the glycidyl groups in the conductive resin composition indicates the number of moles of all the glycidyl groups present in the conductive resin composition.

The invention relates to a conductive resin composition which further includes a (meth)acrylate compound (F). In the conductive resin composition of the invention, the total of the number of moles of the (meth)acryloyl groups in the component (B) and the number of moles of the (meth)acryloyl groups in the component (F) is preferably 8 to 36 with respect to the number of moles of the glycidyl groups in the conductive resin composition taken as 100. Here, the (meth)acrylate compounds (F) do not include the components (B), namely, the compounds having both a (meth)acryloyl group and a glycidyl group at the same time.

The invention relates to a conductive resin composition which further includes an amine curing catalyst (G).

In the conductive resin compositions of the invention, the component (A) is preferably a liquid epoxy resin, and the component (B) is preferably a partially (meth)acrylated cresol novolak epoxy resin and/or a mono(meth)acrylated bisphenol epoxy resin.

The invention relates to a cured product obtainable by B-staging the conductive resin composition and thereafter curing (C-staging) the composition.

The invention relates to a method for producing a cured product, including B-staging the conductive resin composition at a temperature of 70 to 110° C. and thereafter curing the composition at 130 to 250° C. to produce the cured product.

Advantageous Effects of the Invention

The present invention can provide conductive resin compositions which may be B-staged (semi-cured) at a relatively low temperature to exhibit good tack-free properties as well as to have pressure-sensitive tackiness permitting temporary bonding of parts and which may be thereafter cured (C-staged) to give cured products having sufficient bond strength while maintaining low specific resistivity. The invention also provides such cured products of the compositions.

BEST MODE FOR CARRYING OUT THE INVENTION

Figure 1:
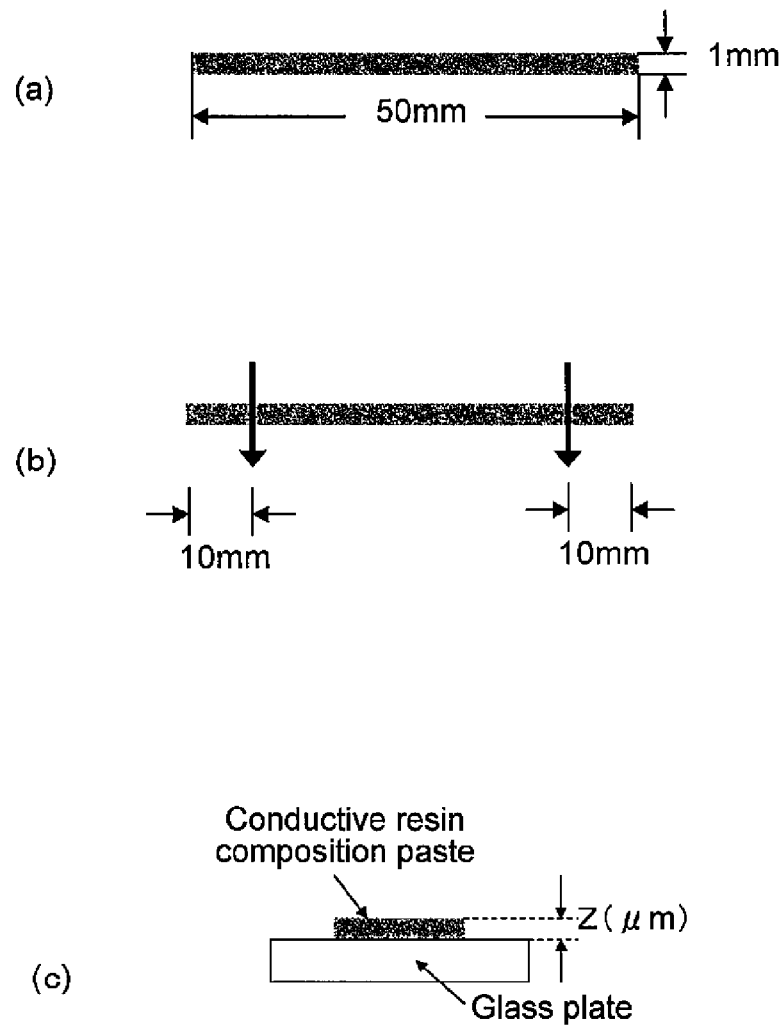
FIG. 1 is a set of views illustrating a method for measuring the specific resistivity of a cured product obtained by curing a conductive resin composition.

A conductive resin composition of the invention includes an epoxy resin (A), a compound (B) having a (meth)acryloyl group and a glycidyl group, a phenolic resin curing agent (C), a radical polymerization initiator (D) and a conductive particle (E).

Through the first stage reaction, the inventive conductive resin composition may be B-staged (semi-cured) by the reaction between the compound (B) having a (meth)acryloyl group and a glycidyl group and the radical polymerization initiator (D) in the conductive resin composition at a relatively low temperature (for example, 70 to 110° C.) to exhibit good tack-free properties as well as pressure-sensitive tackiness permitting temporary bonding of parts. According to the invention, sufficient tack-free properties may be reliably obtained without fail in contrast to when the composition is semi-cured by the evaporation of a solvent or by drying. Further, the invention does not entail any apparatuses for recovering evaporated solvents or any illuminators, thus greatly suppressing the increase in facility costs.

In the second stage reaction of the inventive conductive resin composition, the epoxy resin (A), the compound (B) having a (meth)acryloyl group and a glycidyl group and the phenolic curing agent (C) in the conductive resin composition are reacted together at a temperature higher than the B-staging reaction temperature in the first stage (for example, 130 to 250° C.). Consequently, these resins are cured (C-staged) and the conductive particles attain a good contact with one another with the result that the cured product obtained shows excellent bond strength while maintaining low specific resistivity.

[Epoxy Resins (A)]

The epoxy resin (A) in the inventive conductive resin composition may be preferably a liquid epoxy resin. Here, the epoxy resins (A) exclude compounds having both a (meth)acryloyl group and a glycidyl group at the same time. Such compounds are categorized as the component (B).

Examples of the liquid epoxy resins include bisphenol A epoxy resins with an average molecular weight of about 400 or less; bisphenol F epoxy resins; glycidyl ester epoxy resins such as diglycidyl hexahydrophthalate, diglycidyl 3-methylhexahydrophthalate and diglycidyl hexahydroterephthalate glycidyl neodecanoate; glycidylamine epoxy resins such as diglycidylaniline, diglycidyltoluidine, triglycidyl-p-aminophenol, tetraglycidyl-m-xylylenediamine and tetraglycidyl bis(aminomethyl)cyclohexane; and epoxide compounds such as 1,3-bis(3-glycidoxypropyl)-1,1,3,3-tetramethyldisiloxane, (poly)ethylene glycol diglycidyl ether, (poly)propylene glycol diglycidyl ether, butanediol glycidyl ether, neopentyl glycol diglycidyl ether, 1,4-cyclohexanedimethanol diglycidyl ether, 1,6-hexanediol diglycidyl ether, p-tert-butylphenyl glycidyl ether, dicyclopentadiene dimethanol diglycidyl ether, glycidyl ether of trimethylol propane, diglycidyl ether of polytetramethylene ether glycol, glycerin diglycidyl ether, neopentyl glycol diglycidyl ether, 1,4-phenyl dimethanol diglycidyl ether, trimethylolpropane triglycidyl ether and glycerin triglycidyl ether. Of these, bisphenol A epoxy resins with an average molecular weight of about 400 or less, and bisphenol F epoxy resins are preferably used. The liquid epoxy resins may be used singly, or two or more may be used in combination.

In the conductive resin composition, the content of the epoxy resin (A) is preferably 1 to 15 mass %, more preferably 2 to 12 mass %, and still more preferably 3 to 10 mass % relative to 100 mass % of the total of the conductive resin composition. When the conductive resin composition includes a solvent (H) described later, 100 mass % of the total of the conductive resin composition indicates 100 mass % of the total of the conductive resin composition except the solvent (H). The above content of the epoxy resin (A) in the conductive resin composition ensures that the second stage reaction, namely, the curing (C-staging) reaction will take place at, for example, 130 to 250° C. in such a manner that the epoxy resin (A) and the phenolic resin curing agent (C) undergo ion polymerization reaction while the glycidyl groups in the component (B) and the phenolic resin curing agent as the component (C) undergo ion polymerization reaction so as to give a cured (C-staged) product of the conductive resin composition in which the conductive particles (E) attain a good contact with one another and which consequently exhibits excellent bond strength while maintaining low specific resistivity.

[Compounds (B) Having (Meth)Acryloyl Group and Glycidyl Group]

Examples of the compounds (B) having a (meth)acryloyl group and a glycidyl group used in the inventive conductive resin composition include mono(meth)acrylated bisphenol epoxy resins obtained by the reaction of (meth)acrylic acid with one of the glycidyl groups of bisphenol difunctional epoxy resins and/or partially (meth)acrylated cresol novolak epoxy resins obtained by the reaction of (meth)acrylic acid with part of the glycidyl groups of cresol novolak epoxy resins, as well as include glycidyl acrylate and 4-hydroxybutyl acrylate glycidyl ether. In particular, the compound (B) having a (meth)acryloyl group and a glycidyl group is preferably a partially (meth)acrylated cresol novolak epoxy resin and/or a mono(meth)acrylated bisphenol epoxy resin. The component (B) may be used singly, or two or more may be used in combination. The component (B) may be used in the form of a mixture of the component (A) and the component (B). In the specification, the term "(meth)acryloyl group" is used to refer to one or both of acryloyl group and methacryloyl group. Further, the specification uses the term "(meth)acrylic acid" to refer to one or both of acrylic acid and methacrylic acid, and the term "(meth)acrylate" to refer to one or both of acrylate and methacrylate.

According to the inventive configuration in which the conductive resin composition contains the compound (B) having a (meth)acryloyl group and a glycidyl group, the first stage reaction, namely, the B-staging (semi-curing) reaction takes place at a relatively low temperature (for example, 70 to 110° C.) in such a manner that the (meth)acryloyl groups in the component (B) in the conductive resin composition are caused to undergo radical polymerization reaction by the radical polymerization initiator (D) and the conductive resin composition is apparently cured but actually semi-cured, namely, B-staged so as to achieve sufficient tack-free properties and pressure-sensitive tackiness. Further, curing (C-staging) of the conductive resin composition of the invention by the second stage reaction, namely the curing (C-staging) reaction at, for example, 130 to 250° C. results in a good contact among the conductive particles and consequently excellent bond strength may be obtained while maintaining low specific resistivity.

The compound (B) having a (meth)acryloyl group and a glycidyl group is added to the conductive resin composition in such an amount that the number of moles of the (meth) acryloyl groups in the component (B) is preferably 7 to 28, more preferably 8 to 27, and still more preferably 9 to 26 with respect to the number of moles of the glycidyl groups in the conductive resin composition taken as 100. Here, the number of moles of the glycidyl groups in the conductive resin composition indicates the number of moles of all the glycidyl groups present in the conductive composition. If the number of moles of the (meth)acryloyl groups in the component (B) is less than 7 with respect to the number of moles of the glycidyl groups in the conductive resin composition taken as 100, it becomes difficult for the conductive resin composition to be B-staged (semi-cured) in the first stage reaction at a relatively low temperature (for example, 70 to 110° C.) to attain good tack-free properties as well as pressure-sensitive tackiness permitting temporary bonding of parts. If the number of moles of the (meth)acryloyl groups in the component (B) exceeds 28 with respect to the number of moles of the glycidyl groups in the conductive resin composition taken as 100, the first stage reaction, namely, the radical polymerization reaction proceeds too far and the B-staged (semi-cured) composition will not exhibit the desired pressure-sensitive tackiness permitting temporary bonding of parts. The number of moles of the glycidyl groups in the conductive resin composition is calculated according to Equation (1) below, and the number of moles of the (meth)acryloyl groups in the component (B) is calculated according to Equation (2) below.

Number of moles of glycidyl groups in conductive resin composition=(mass (g) of epoxy resin (A) in conductive resin composition)×(number of glycidyl groups in 1 mol of epoxy resin (A)/mass (g) of 1 mol of epoxy resin (A))+(mass (g) of compound (B) having (meth)acryloyl group and glycidyl group in conductive resin composition)× (number of glycidyl groups in 1 mol of compound (B) having (meth)acryloyl group and glycidyl group/mass (g) of 1 mol of compound (B) having (meth)acryloyl group and glycidyl group) (1)

Number of moles of (meth)acryloyl groups in component (B)=(mass (g) of compound (B) having (meth)acryloyl group and glycidyl group in conductive resin composition)×(number of (meth) acryloyl groups in 1 mol of compound (B) having (meth)acryloyl group and glycidyl group/mass (g) of 1 mol of compound (B) having (meth)acryloyl group and glycidyl group) (2)

[Phenolic Resin Curing Agents (C)]

The phenolic resin curing agent (C) used in the inventive conductive resin composition may be any of phenolic resin initial condensates generally used as curing agents for epoxy resins and may be resole types or novolak types. Examples of the phenolic resin curing agents (C) include bisphenol resins, allylphenol novolak resins, novolak phenolic resins, phenolaralkyl resins, dicyclopentadiene phenolic resins and biphenyl phenolic resins. The phenolic resin curing agents (C) may be used singly, or two or more may be used in combination. In particular, o-allylphenol novolak resins and bisphenol resins are preferred.

In the conductive resin composition, the content of the phenolic resin curing agent (C) is such that the number of moles of the hydroxyl (OH) groups in the phenolic resin curing agent (C) is preferably 0.25 to 3.5, more preferably 0.3 to 3, and still more preferably 0.4 to 2.5 with respect to the number of moles of the glycidyl groups in the conductive resin composition taken as 100. Here, the number of moles of the glycidyl groups in the conductive resin composition indicates the number of moles of all the glycidyl groups present in the conductive resin composition. The above content of the phenolic resin curing agent (C) ensures that the conductive resin composition can be cured in the second stage reaction at, for example, 130 to 250° C. to give a cured product having excellent bond strength while maintaining low specific resistivity. The number of moles of the hydroxyl (OH) groups in the component (C) is calculated according to Equation (3) below.

Number of moles of hydroxyl (OH) groups in component (C)=mass (g) of phenolic resin curing agent (C) in conductive resin composition×number of hydroxyl (OH) groups in 1 mol of phenolic resin curing agent (C)/mass (g) of 1 mol of phenolic resin curing agent (C) (3)

[Radical Polymerization Initiators (D)]

The radical polymerization initiator (D) in the conductive resin composition is not particularly limited, but is preferably a peroxide. When a peroxide is used as the radical polymerization initiator (D), it is preferable that its decomposition temperature be 70 to 110° C. Specific examples of the peroxides as the radical polymerization initiators (D) include 1,1,3,3-tetramethylbutyl peroxy-2-ethyl hexanoate, t-butyl peroxybenzoate, t-butyl peroxyneodecanoate, cumyl peroxyneodecanoate, 1,1,3,3-tetramethylbutyl peroxyneodecanoate, t-butyl peroxybenzoate, dicumyl peroxide, di-t-butyl peroxide, di-t-hexyl peroxide, di(2-t-butylperoxyisopropyl)benzene, 2,2-di(4,4-di-(butylperoxy)cyclohexyl) propane, p-menthane hydroperoxide, diisopropylbenzene hydroperoxide, 1,1,3,3-tetramethylbutyl hydroperoxide, cumene hydroperoxide, 1,1-di(t-butylperoxy)cyclohexane, cyclohexanone peroxide, and 1,1-di(t-hexylperoxy)cyclohexane.

In the conductive resin composition, the content of the radical polymerization initiator (D) is preferably 0.5 to 6 mass %, more preferably 1 to 5 mass %, and still more preferably 2 to 4 mass % relative to the content of the compound (B) having a (meth)acryloyl group and a glycidyl group in the conductive resin composition. In other words, the content of the radical polymerization initiator (D) may be preferably 0.5 to 6 parts by mass, more preferably 1 to 5 parts by mass, and still more preferably 2 to 4 parts by mass with respect to 100 parts by mass of the compound (B) having a (meth)acryloyl group and a glycidyl group in the conductive composition. This content of the radical polymerization initiator (D) ensures that the conductive resin composition can be B-staged (semi-cured) in the first stage reaction at a relatively low temperature (for example, 70 to 110° C.) to achieve sufficient tack-free properties and pressure-sensitive tackiness. The content of the radical polymerization initiator (D) in the conductive resin composition is preferably 0.01 to 0.1 mass %, more preferably 0.03 to 0.08 mass %, and still more preferably 0.04 to 0.07 mass % relative to the total of the conductive resin composition taken as 100 mass %. When the conductive resin composition includes a solvent (H) described later, 100 mass % of the total of the conductive resin composition indicates 100 mass % of the total of the conductive resin composition except the solvent (H).

[Conductive Particles (E)]

The conductive particles (E) in the conductive resin composition are not particularly limited. Examples thereof include metallic fine powders such as silver (Ag), gold (Au), copper (Cu), nickel (Ni), palladium (Pd), tin (Sn) and alloys of these metals, and inorganic fillers coated with gold, silver and palladium. Silver or alloys containing silver are preferred. The shapes thereof are not particularly limited. Exemplary shapes include spheres and flakes (scales). A single type, or two or more types of conductive particles may be used. The conductive particles, which may be spheres or flakes, preferably have a BET specific surface area of 0.2 to 1.5 $m^2/g$, more preferably 0.3 to 1.2 $m^2/g$, and a tap density of 1 to 8 $g/cm^3$, more preferably 2 to 6 $g/cm^3$.

In the conductive resin composition, the content of the conductive particles (E) is preferably 50 to 95 mass %, more preferably 55 to 90 mass %, and still more preferably 60 to 85 mass % relative to 100 mass % of the total of the conductive resin composition. When the conductive resin composition includes a solvent (H) described later, 100 mass % of the total of the conductive resin composition indicates 100 mass % of the total of the conductive resin composition except the solvent (H). When present in the conductive resin composition in the above content, the conductive particles (E) do not deteriorate tack-free properties and pressure-sensitive tackiness when the composition is semi-cured, namely, B-staged. Further, the above content ensures that the conductive particles attain a good contact with one another during and after curing with the result that low specific resistivity may be maintained.

[(Meth)Acrylate Compounds (F)]

Preferably, the conductive resin composition of the invention further includes a (meth)acrylate compound (F). By containing the (meth)acrylate compound (F), the conductive resin composition may be semi-cured (B-staged) in the first stage reaction so as to achieve excellent tack-free properties. Here, the (meth)acrylate compounds (F) do not include the components (B), namely, the compounds having both a (meth)acryloyl group and a glycidyl group at the same time. The component (F) may be used in the form of a mixture of the component (A), the component (B) and the component (F). Specific examples of the (meth)acrylate compounds (F) include bisphenol A diglycidyl ether methacrylic acid adduct, bisphenol A diglycidyl ether acrylic acid adduct, neopentyl glycol dimethacrylate, 1,6-hexanediol dimethacrylate, 1,9-nonanediol dimethacrylate, 1,10-decanediol dimethacrylate, dimethylol-tricyclodecane dimethacrylate, trimethylol propane trimethacrylate, 2-hydroxy-3-acryloyloxypropyl methacrylate, neopentyl glycol hydroxypivalate dimethacrylate, 2-methacryloyloxyethyl phosphate, 2-hydroxyethyl methacrylate, 2-hydroxypropyl methacrylate, 2-hydroxybutyl methacrylate, 2-methacryloyloxyethyl-succinic acid, glycerol dimethacrylate, 2-methacryloyloxyethyl-phthalic acid, γ-butyrolactone methacrylate, 2-methyl-2-adamantyl methacrylate, 2-ethyl-2-adamantyl methacrylate, ethoxylated cyclohexanedimethanol dimethacrylate, acrylates of these compounds, 1,4-cyclohexanedimethanol monoacrylate, methoxydipropylene glycol acrylate, neopentyl glycol acrylate benzoate, propylene oxide-modified diacrylate of bisphenol A, and pentaerythritol triacrylate.

The (meth)acrylate compound (F) is added to the conductive resin composition in such an amount that the total of the number of moles of the (meth)acryloyl groups in the component (B) and the number of moles of the (meth)acryloyl groups in the component (F) is preferably 8 to 36, more preferably 9 to 35, and still more preferably 10 to 34 with respect to the number of moles of the glycidyl groups in the conductive resin composition taken as 100. Here, the number of moles of the glycidyl groups in the conductive resin composition indicates the number of moles of all the glycidyl groups present in the conductive composition. If the total of the number of moles of the (meth)acryloyl groups in the component (B) and the number of moles of the (meth)acryloyl groups in the component (F) is less than 8 with respect to the number of moles of the glycidyl groups in the conductive resin composition taken as 100, the conductive resin composition may fail to be B-staged (semi-cured) in the first stage reaction at a relatively low temperature (for example, 70 to 110° C.) to attain tack-free properties. If the total of the number of moles of the (meth)acryloyl groups in the component (B) and the number of moles of the (meth)acryloyl groups in the component (F) exceeds 36 with respect to the number of moles of the glycidyl groups in the conductive resin composition taken as 100, the first stage reaction, namely, the radical polymerization reaction proceeds too far and the B-staged (semi-cured) composition will not exhibit the desired pressure-sensitive tackiness permitting temporary bonding of parts. The number of moles of the (meth)acryloyl groups in the component (F) is calculated according to Equation (4) below.

Number of moles of (meth)acryloyl groups in (meth)acrylate compound (F)=mass (g) of (meth)acrylate compound (F) in conductive resin composition×number of (meth)acryloyl groups in 1 mol of (meth)acrylate compound (F)/mass (g) of 1 mol of (meth)acrylate compound (F)    (4)

[Amine Curing Catalysts (G)]

Preferably, the conductive resin composition of the invention further includes an amine curing catalyst (G). The amine curing catalyst (G) is preferably one that has a reaction initiation temperature exceeding 130° C. By containing the amine curing catalyst (G), the conductive resin composition may be cured, namely, C-staged in the second stage reaction at, for example, 130 to 250° C. to give a cured product having excellent bond strength while maintaining low specific resistivity. Examples of the amine curing catalysts (G) include dicyandiamide; carboxylic acid hydrazides such as adipic acid hydrazide and isophthalic acid hydrazide; and imidazole derivatives such as 2-phenyl-4,5-dihydroxymethylimidazole and 2-phenyl-4-methyl-5-hydroxymethylimidazole. The amine curing catalysts may be used singly, or two or more may be used in combination. In particular, 2-phenyl-4,5-dihydroxymethylimidazole, 2-phenyl-4-methyl-5-hydroxymethylimidazole, dicyandiamide and adipic acid hydrazide are preferable.

In the conductive resin composition, the content of the amine curing catalyst (G) is preferably 0.5 to 15 mass %, more preferably 1 to 10 mass %, and still more preferably 2 to 8 mass % relative to the total content of the component (A) and the component (C) in the conductive resin composition. In other words, the content of the amine curing catalyst (0) may be preferably 0.5 to 15 parts by mass, more preferably 1 to 10 parts by mass, and still more preferably 2 to 8 parts by mass with respect to 100 parts by mass of the total amount of the epoxy resin (A) and the phenolic resin curing agent (C) in the conductive resin composition. This content of the amine curing catalyst (G) ensures that the conductive resin composition may be cured in the second stage reaction at, for example, 130 to 250° C. to give a cured product having excellent bond strength while maintaining low specific resistivity. In the conductive resin composition, the content of the amine curing catalyst (G) is preferably 0.3 to 1.5 mass %, more preferably 0.5 to 1.2 mass %, and still more preferably 0.7 to 1.0 mass % relative to 100 mass % of the total of the conductive resin composition. When the conductive resin composition includes a solvent (H) described below, 100 mass % of the total of the conductive resin composition indicates 100 mass % of the total of the conductive resin composition except the solvent (H).

[Solvents (H)]

The conductive resin composition of the invention may further contain a solvent (H). By containing the solvent (H), the conductive resin composition exhibits good application and supply properties when printed on surfaces such as substrates. Examples of the solvents (H) include diethyl diglycol, diethylene glycol diethyl ether, diethylene glycol monoethyl ether, diethylene glycol monoethyl ether acetate, dibasic acid esters such as dimethyl glutarate, and benzyl alcohol. In particular, diethylene glycol diethyl ether, diethylene glycol monoethyl ether and diethylene glycol monoethyl ether acetate are preferable.

The content of the solvent (H) in the conductive resin composition is not particularly limited as long as the conductive resin composition may be uniformly applied and supplied by a printing method. The content of the solvent (H) may be 0 to 10 parts by mass with respect to 100 parts by mass of the total of the conductive resin composition. Here, 100 parts by mass of the total of the conductive resin composition indicates 100 parts by mass of the total of the conductive resin composition except the solvent (H).

[Silane Coupling Agents (I)]

The conductive resin composition of the invention may contain a silane coupling agent (I) in addition to the aforementioned components in order to improve wetting properties and adhesion with respect to the substrate. Examples of the silane coupling agents include 3-glycidoxypropyltrimethoxysilane, γ-glycidoxypropyltriethoxysilane, γ-glycidoxypropylmethyldimethoxysilane and β-(3,4-epoxycyclohexyl)ethyl trimethoxysilane. The content of the silane coupling agent (I) in the conductive resin composition is not particularly limited, but is preferably 0.1 to 1 mass %, and more preferably 0.2 to 0.8 mass % with respect to 100 mass % of the total of the conductive resin composition. Here, 100 mass % of the total of the conductive resin composition indicates 100 mass % of the total of the conductive resin composition except the solvent (H).

[Spacers (J)]

The conductive resin composition of the invention may contain a spacer (J) in addition to the aforementioned components in order to maintain a certain film thickness when the conductive resin composition is applied and supplied onto the substrate. The spacer is preferably spherical with a diameter of 10 to 100 μm. The materials of the spacers are not particularly limited. Examples thereof include glasses, acrylic resins, silicas and styrene-vinyl benzene copolymers. The content of the spacer (J) in the conductive resin composition is not particularly limited, but is preferably 0.1 to 1 mass %, and more preferably 0.2 to 0.8 mass % with respect to 100 mass % of the total of the conductive resin composition. Here, 100 mass % of the total of the conductive resin composition indicates 100 mass % of the total of the conductive resin composition except the solvent (H).

In addition to the aforementioned components, the conductive resin composition of the invention may contain additives such as defoaming agents for removing bubbles trapped in the composition, coloring materials such as dyes and pigments, and others such as leveling agents for improving wetting properties with respect to adherends.

The conductive resin composition of the invention may be produced by any methods without limitation. The composition may be produced by admixing the components in prescribed amounts in a mixer such as a planetary stirrer, a dissolver, a bead mill, a RAIKAI mill, a three-roll mill, a rotary mixer or a twin-screw mixer.

A cured product from the inventive conductive resin composition is preferably a cured product obtained by B-staging (semi-curing) the conductive resin composition in the first stage reaction at a temperature of 70 to 110° C. and thereafter curing (C-staging) the conductive resin composition in the second stage reaction at an increased temperature of 130 to 250° C. After the completion of the first stage reaction, namely, when the conductive resin composition is subjected to the second stage reaction, the viscosity of the composition at 80 to 100° C. is preferably not more than 50,000 Pa·s, and more preferably not more than 20,000 Pa·s. When the viscosity at 80 to 100° C. in the second stage reaction is preferably not more than 50,000 Pa·s, and more preferably not more than 20,000 Pa·s, the conductive resin composition exhibits improved wetting properties with respect to adherends during the main curing, and thus improved adhesion is achieved.

When B-staged (semi-cured) in the first stage reaction at 70 to 110° C., the conductive resin composition of the invention realizes tack-free properties and exhibits excellent pressure-sensitive tackiness permitting temporary bonding of parts or the like. Further, curing (C-staging) of the inventive conductive resin composition in the second stage reaction at 130 to 250° C. gives a cured product in which the conductive particles attain a good contact with one another and thus which shows excellent bond strength while maintaining low specific resistivity.

The inventive conductive resin composition may be B-staged to realize sufficient tack-free properties and to exhibit excellent pressure-sensitive tackiness permitting temporary bonding of parts and further may be cured into a cured product which shows excellent bond strength while maintaining low specific resistivity. Thus, the inventive composition may be used as a die bonding agent, specifically, may be used in an application where a Ag paste of the composition as an alternative to a semiconductor wafer Au plating material is printed onto a wafer, B-staged, subjected to dicing, and bonded to a lead frame, and also may find use in applications where the composition is used to bond film antennas of various sensors. In addition, the inventive conductive resin compositions may be suitably used as LID or casing adhesives.

EXAMPLES

Hereinbelow, the present invention will be described in further detail by presenting Examples and Comparative Examples. The scope of the invention is not limited to these Examples.

Examples 1 to 9 and Comparative Examples 1 to 4

Components in amounts shown in Table 1 (the values for the components in Table 1 indicate parts by mass) were mixed together in a three-roll mill at 25° C. to give conductive resin compositions of Examples 1 to 9 and Comparative Examples 1 to 4. These conductive resin compositions were B-staged (semi-cured) at 70 to 110° C., and tack properties and pressure-sensitive tackiness were evaluated by touch. Thereafter, the compositions were cured (C-staged) at 130 to 250° C. and were tested to measure specific resistivity and bond strength. The measurement methods are described later. The results are shown in Table 1.

The components (A) to (J) used in Examples and Comparative Examples are the following.

(A) Epoxy Resins

Cresol novolak epoxy resin, epoxy equivalent weight 170
Bisphenol F epoxy resin, epoxy equivalent weight 160
Biphenyl epoxy resin, epoxy equivalent weight 190
1,6-Hexanediol diglycidyl ether, epoxy equivalent weight 120

(C) Phenolic Curing Agent

Bisphenol F, hydroxyl equivalent weight 120

(D) Radical Polymerization Initiator 1,1,3,3-Tetramethylbutyl peroxy-2-ethyl hexanoate (E) Conductive Particles Flake silver (Ag) powder, BET specific surface area: 0.5 $m^2/g$, tapped (tap) density: 3.7 $g/cm^3$
Spherical silver (Ag) powder, BET specific surface area: 1.0 $m^2/g$, tapped (tap) density: 5.0 $g/cm^3$ (F) Epoxy (Meth)acrylate Bisphenol A difunctional epoxy di(meth)acrylate, (meth)acrylate equivalent weight 210

(G) Amine Curing Catalysts

2-Phenyl-4,5-dihydroxymethylimidazole
2-Phenyl-4-methyl-5-hydroxymethylimidazole (H) Solvent Diethylene glycol diethyl ether (I) Silane Coupling Agent 3-Glycidoxypropyltrimethoxysilane (organosilane)

(J) Spacer

Spherical styrene-vinyl benzene copolymer spacer 50 μm in diameter

Examples used a mixture of an epoxy resin (A) and a compound (B) having a (meth)acryloyl group and a glycidyl group, and/or a mixture of an epoxy resin (A), a compound (B) having a (meth)acryloyl group and a glycidyl group, and a (meth)acrylate compound (F):

a mixture of a cresol novolak epoxy resin (A) and a partially (meth)acrylated cresol novolak epoxy resin (B), manufactured by SHOWA POLYMER, product name: SP1504Q, epoxy equivalent weight 305, (meth)acrylate equivalent weight 305;

a mixture of 56 mass % of a bisphenol A epoxy resin (A), 38 mass % of a bisphenol A mono(meth)acrylate (B), and 6 mass % of bisphenol A diglycidyl ether dimethacrylic acid adduct (dimethacrylate of bisphenol A diglycidyl ether) (F), epoxy equivalent weight 271, (meth)acrylate equivalent weight 271.

After the conductive resin compositions having the chemical makeups shown in Table 1 were B-staged (semi-cured), tack properties and pressure-sensitive tackiness were evaluated by touch in the following manner.

[Tack Properties by Touch]

Onto a slide glass 76 mm in length, 26 mm in width and 1.3 mm in thickness, the conductive resin composition having the chemical makeup shown in Table 1 was stencil printed with a thickness of 120 μm, thus preparing a test piece. The stencil used had a thickness of 120 μm. The test piece was dried with an air blow dryer controlled at 90±5° C. for 20 minutes. The B-staged conductive resin composition was touched by a finger, and tack properties were evaluated based on whether or not the conductive resin composition became attached to the finger. The symbol "O (tack-free)" indicates that the conductive resin composition did not become attached to the finger, and the symbol "x (tacky)" indicates that the conductive resin composition became attached to the finger.

[Pressure-Sensitive Tackiness]

Onto a slide glass 76 mm in length, 26 mm in width and 1.3 mm in thickness, the conductive resin composition having the chemical makeup shown in Table 1 was stencil printed with a thickness of 120 μm, thus preparing a test piece. The stencil used had a thickness of 120 μm. The test piece was dried with an air blow dryer controlled at 90±5° C. for 20 minutes. The test piece was then tested on a tack tester (manufactured by RHESCA CORPORATION, product name: Tacking Tester) to measure pressure-sensitive tackiness. The tack force (N) was calculated according to the following equation. The average of four samples (n=4) was obtained as the test value.

Tack force (N)=Measured value (gf)×0.001×9.8
Tack force testing conditions
Immersion Speed: 5 mm/min.
Test Speed: 600 mm/min.
Immersion: 250 gf
Press Time: 3 sec.
Distance: 5 mm
Probe Temp.: normal temperature
Hot Plate Temp.: normal temperature After the conductive resin compositions having the chemical makeups shown in Table 1 were B-staged (semi-cured), they were further cured (C-staged) and tested to measure the specific resistivity and the bond strength by the following methods.

[Specific Resistivity]

Onto a slide glass 76 mm in length, 26 mm in width and 1.3 mm in thickness, the conductive resin composition having the chemical makeup shown in Table 1 was stencil printed with a thickness of 120 mm in a 50 mm long and 1 mm wide pattern as illustrated in FIG. 1, thus preparing a test piece (see FIG. 1(a)). The stencil used was a 120 OL109\f"Symbol"\s12m thick film. The test piece was semi-cured (B-staged) by drying with an air blow dryer controlled at 90±5° C. for 20 minutes followed by cooling. Thereafter, the test piece was cured (C-staged) with an air blow dryer controlled at 165±5° C. in 50 minutes. The cured product resulting from the curing of the conductive resin composition was tested on 4261A LCR Meter manufactured by YHP to measure the resistance X (Ω) between both end faces. The thickness Z (μm) of the cured product was measured with a surface roughness profiler (manufactured by TOKYO SEIMITSU CO., LTD., model: SURFCOM 1500SD2). The thickness Z (μm) of the cured product was measured from above the pattern with respect to portions 10 mm in length from the ends of the 50 mm long and 1 mm wide pattern (the two portions indicated with arrows in FIGS. 1(b) and (c)). The specific resistivity r (Ω·cm) was calculated according to the following equation. The average of five samples (n=5) was obtained as the test value.

$$\rho(\Omega\cdot cm)=(0.1/5.0)\times X(\Omega)\times Z\times 10^{-4} (\Omega\cdot cm)$$

[Bond Strength]

Figure 2:
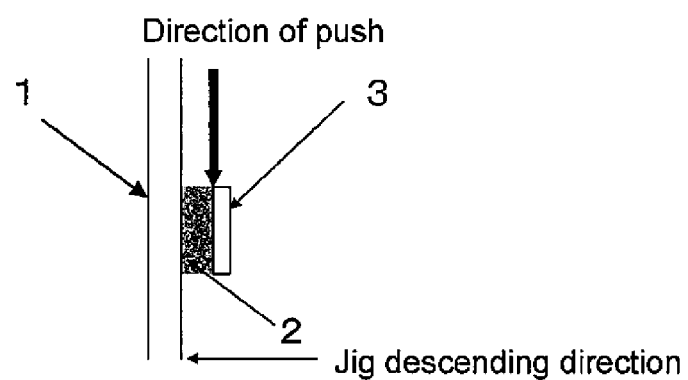
FIG. 2 is a view illustrating a method for measuring the bond strength of a cured product obtained by curing a conductive resin composition.

Onto an alumina plate 1 that was 20 mm in length, 20 mm in width and 1.6 mm in thickness, the conductive resin composition 2 having the chemical makeup shown in Table 1 was stencil printed with a thickness of 120 μm in a 1.5 mm long and 1.5 mm wide pattern, thus preparing a test piece. The stencil used was a 120 μm thick film. The test piece was semi-cured (B-staged) by drying with an air blow dryer controlled at 90±5° C. for 20 minutes followed by cooling. Thereafter, an alumina plate 3 that was 1.5 mm in length, 3.0 mm in width and 0.5 mm in thickness was placed onto the printed pattern of the conductive resin composition in the test piece. The composition was then cured with an air blow dryer controlled at 165±5° C. in 50 minutes. With use of MODEL-1605HTP Strength Tester (manufactured by AIKOH ENGI- NEERING CO., LTD.), a push was applied from the side as indicated with a thick arrow in FIG. 2 to the plane of bonding between the cured conductive resin composition (the cured product) 2 and the 1.5 mm×3.0 mm×0.5 mm alumina plate 3. The force at the separation of the bonded alumina plate 3 was obtained as the bond strength (N/mm$^2$). During the measurement, the jig was descended at a speed of 12 mm/min (a thin arrow). The average of ten samples (n=10) was obtained as the test value.

TABLE 1

| Components | | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 | Comp. Ex. 4 |
|---|---|---|---|---|---|---|---|---|---|---|---|---|---|---|
| Epoxy resins (A) | Bisphenol A epoxy resin (Component A in the mixture of components A, B and F) | 1.12 | 1.12 | 1.46 | 1.40 | — | 1.40 | 1.12 | 1.12 | 3.36 | — | — | — | — |
| | Bisphenol F epoxy resin | 4.00 | — | — | — | 4.00 | 5.00 | 4.00 | 4.00 | 4.00 | 5.50 | 8.40 | 12.00 | 5.00 |
| | Biphenyl epoxy resin | — | 4.00 | 5.20 | 5.00 | — | — | — | — | — | — | — | — | 5.00 |
| | 1,6-Hexanediol diglycidyl ether | — | — | — | — | — | — | — | — | — | — | — | 4.00 | — |
| | Cresol novolak epoxy resin (SP1504Q) (Component A in the mixture of components A and B) | 2.46 | 2.46 | 3.14 | 3.08 | 3.69 | 1.54 | 2.46 | 2.46 | — | — | — | — | — |
| Compounds (B) with (meth)acryloyl group and glycidyl group | Partially acrylated cresol novolak epoxy (SP1504Q) (Component B in the mixture of components A and B) | 0.82 | 0.82 | 1.05 | 1.03 | 1.23 | 0.51 | 0.82 | 0.82 | — | — | — | — | — |
| | Bisphenol A epoxy monoacrylate (Component B in the mixture of components A, B and F) | 0.76 | 0.76 | 0.99 | 0.95 | — | 0.95 | 0.76 | 0.76 | 2.28 | — | — | — | — |
| Phenolic resin curing agent (C) | Bisphenol F | 4.40 | 4.40 | 4.40 | 4.40 | 4.40 | 4.40 | 4.40 | 4.40 | 4.40 | 4.00 | 5.00 | 3.00 | 5.00 |
| Radical polymerization initiator (D) | 1,1,3,3-Tetramethylbutyl peroxy-2-ethyl hexanoate | 0.05 | 0.05 | 0.05 | 0.06 | 0.05 | 0.05 | 0.05 | 0.05 | 0.05 | 0.05 | 0.05 | 0.05 | — |
| Conductive particles (E) | Flake Ag powder (BET specific surface area: 0.5 m$^2$/g, tap density: 3.7 g/cm$^3$) | 42.00 | 42.00 | 40.00 | 40.00 | 42.00 | 42.00 | 42.00 | 42.00 | 42.00 | 42.00 | 42.00 | 37.50 | 42.00 |
| | Spherical Ag powder (BET specific surface area: 1.0 m$^2$/g, tap density: 5.0 g/cm$^3$) | 42.00 | 42.00 | 40.00 | 40.00 | 42.00 | 42.00 | 42.00 | 42.00 | 42.00 | 42.00 | 42.00 | 37.50 | 42.00 |
| (Meth)acrylate compound (F) | Bisphenol A glycidyl ether methacrylic acid adduct (Component F in the mixture of components A, B and F) | 0.12 | 0.12 | 0.16 | 0.15 | — | 0.15 | 0.12 | 0.12 | 0.36 | — | — | — | — |
| Amine curing catalysts (G) | 2-Phenyl-4,5-dihydroxymethylimidazole | 0.75 | 0.75 | 0.90 | 0.95 | 0.75 | 0.75 | — | 0.75 | 0.75 | 0.75 | 0.75 | — | 0.75 |
| | 2-Phenyl-4-methyl-5-hydroxymethylimidazole | — | — | — | — | — | — | 0.75 | — | — | — | — | — | — |
| | 2-Phenyl-4-methylimidazole | — | — | — | — | — | — | — | — | — | — | — | 1.00 | — |
| Solvent (H) | Diethylene glycol diethyl ether | 2.50 | 2.50 | 2.50 | 2.50 | 2.50 | 2.50 | 2.50 | 2.50 | 2.50 | 2.50 | 2.50 | 1.50 | 2.50 |
| Silane coupling agent (I) | 3-Glycidoxypropyltrimethoxysilane (organosilane) | 0.45 | 0.45 | 0.60 | 0.55 | 0.45 | 0.45 | 0.45 | 0.45 | 0.45 | 0.45 | 0.45 | — | 0.50 |
| Spacer (J) | Styrene-vinyl benzene copolymer spacer (diameter 50 μm) | — | — | — | — | — | — | — | 0.30 | — | — | — | — | — |
| The number of moles of glycidyl groups in conductive resin composition | | 100 | 100 | 100 | 100 | 100 | 100 | 100 | 100 | 100 | 100 | 100 | 100 | 100 |
| The number of moles of (meth)acryloyl groups in component (B) to 100 moles of glycidyl groups in conductive resin composition | | 12.3 | 13.4 | 13.3 | 12.3 | 13.3 | 9.1 | 12.3 | 12.3 | 25.3 | 0.0 | 0.0 | 0.0 | 0.0 |
| The number of moles of (meth)acryloyl groups in components (B) and (F) to 100 moles of glycidyl groups in conductive resin composition | | 13.4 | 14.6 | 14.5 | 13.4 | 13.3 | 10.3 | 13.4 | 13.4 | 33.3 | 60.9 | 11.6 | 13.9 | 0.0 |
| The number of moles of hydroxyl (OH) groups in component (C) to 100 moles of glycidyl groups in conductive resin composition | | 0.905 | 0.988 | 0.764 | 0.724 | 0.908 | 0.834 | 0.905 | 0.905 | 2.208 | 1.000 | 0.818 | 0.236 | 0.739 |
| After first stage reaction (B-stage) | Tack to touch ○: Not attached to finger X: Attached to finger | ○ | ○ | ○ | ○ | ○ | ○ | ○ | ○ | ○ | ○ | ○ | ○ | X |
| | Pressure-sensitive tackiness Tack force (N) after 20 min. at 90° C | 7 | 2 | 2 | 10 | 4 | 6 | 5 | 5.5 | 9 | 0.1 | 0.2 | 0.1 | 10 |
| After second stage reaction (130-250° C.) | Specific resistivity (×10$^{-4}$ Ω·cm) | 7 | 5 | 5 | 30 | 5 | 10 | 15 | 15 | 26 | 100 | 50 | 80 | 5 |
| | Bond strength (N/mm$^2$) | 40 | 30 | 30 | 60 | 30 | 40 | 30 | 20 | 50 | 0 | 10 | 0 | 50 |

In Examples 1 to 9, as shown in Table 1, the compositions that were B-staged (semi-cured) in the first stage reaction at a temperature of 90° C.±5° C. realized tack-free properties and also exhibited good pressure-sensitive tackiness permitting temporary bonding of parts with a force of 2 (N) or above. Further, the cured products of Examples 1 to 9 obtained by the second stage reaction at a temperature of 165±5° C. maintained a low specific resistivity of $5\times10^{-4}$ to $30\times10^{-4}$ (Ω·cm) and exhibited an excellent bond strength of 20 N/mm$^2$ or more. In Comparative Examples 1 to 3, on the other hand, B-staging (semi-curing) realized tack-free properties but resulted in a low pressure-sensitive tackiness of 0.1 (N) or 0.2 (N), 1/10 or less of the values in Examples 1 to 9. Further, the cured products in Comparative Examples 1 to 3 had large specific resistivity values but very low bond strength. In Comparative Example 4, the B-staged (semi-cured) composition showed pressure-sensitive tackiness but failed to achieve tack-free properties and became attached to the finger.

INDUSTRIAL APPLICABILITY

The inventive conductive resin compositions may be B-staged (semi-cured) at a relatively low temperature to realize sufficient tack-free properties and to exhibit excellent pressure-sensitive tackiness permitting temporary bonding of parts and further may be thereafter cured (C-staged) into cured products which show excellent bond strength while maintaining low specific resistivity. Thus, the inventive compositions may be used as die bonding agents for bonding parts to lead frames, and also may be used in applications where the compositions are used to bond film antennas of various sensors. In addition, the inventive conductive resin compositions may be suitably used as LID or casing adhesives. The inventive compositions are thus highly useful in industry.

REFERENCE SIGNS LIST

1 ALUMINA PLATE
2 CONDUCTIVE RESIN COMPOSITION
3 ALUMINA PLATE

The invention claimed is:
1. A conductive resin composition comprising:
(A) an epoxy resin,
(B) at least one compound having a (meth)acryloyl group and a glycidyl group,
(C) a phenolic resin curing agent,
(D) a radical polymerization initiator and
(E) a conductive particle,
wherein the number of moles of (meth)acryloyl groups in (B) is 7 to 28 with respect to the number of moles of the glycidyl groups in the conductive resin composition taken as 100.

2. The conductive resin composition according to claim 1, further comprising (F) a (meth)acrylate compound.

3. The conductive resin composition according to claim 2, wherein the total of the number of moles of the (meth)acryloyl groups in (B) and the number of moles of the (meth)acryloyl groups in (F) is 8 to 36 with respect to the number of moles of the glycidyl groups in the conductive resin composition taken as 100.

4. The conductive resin composition according to claim 2 further comprising (G) an amine curing catalyst.

5. The conductive resin composition according to claim 2, wherein (A) is a liquid epoxy resin.

6. The conductive resin composition according to claim 2, wherein (B) is a partially (meth)acrylated cresol novolak epoxy resin and/or a mono(meth)acrylated bisphenol epoxy resin.

7. The conductive resin composition according to claim 1, further comprising (G) an amine curing catalyst.

8. The conductive resin composition according to claim 1, wherein (A) is a liquid epoxy resin.

9. The conductive resin composition according to claim 1, wherein (B) is a partially (meth)acrylated cresol novolak epoxy resin and/or a mono (meth) acrylated bisphenol epoxy resin.

10. A cured product obtained by B-staging the conductive resin composition according to claim 1 and thereafter curing the composition.

11. A method for producing a cured product, comprising B-staging the conductive resin composition according to claim 1 at a temperature of 70 to 110° C. and thereafter curing the composition at 130 to 250° C. to produce the cured product.

* * * * *